US007447657B1

(12) United States Patent
Krajewski et al.

(10) Patent No.: US 7,447,657 B1
(45) Date of Patent: Nov. 4, 2008

(54) METHOD AND SYSTEMS FOR HANDLING METHOD LEVEL PROCESSING IN CONNECTION WITH ACCOUNT PRICING

(75) Inventors: Steve R. Krajewski, Omaha, NE (US); Keith A Rose, Omaha, NE (US); Rebecca J. Avsec, Omaha, NE (US); Molly Plozay, Omaha, NE (US); Richard L. Savage, Salt Lake City, UT (US); Tod O. Brockley, Omaha, NE (US); Jeffrey S. Harden, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1297 days.

(21) Appl. No.: 10/098,586

(22) Filed: Mar. 14, 2002

(51) Int. Cl.
*G06Q 40/00* (2006.01)
(52) U.S. Cl. .............................. 705/38; 705/35; 705/39
(58) Field of Classification Search .................... 705/38
See application file for complete search history.

(56) References Cited

U.S. PATENT DOCUMENTS

| 5,970,478 | A | * | 10/1999 | Walker et al. ................. 705/35 |
| 6,202,005 | B1 | | 3/2001 | Mahaffey |
| 6,349,242 | B2 | | 2/2002 | Mahaffey |
| 6,374,230 | B1 | * | 4/2002 | Walker et al. ................. 705/35 |
| 7,092,905 | B2 | * | 8/2006 | Behrenbrinker et al. ....... 705/39 |
| 2002/0069122 | A1 | * | 6/2002 | Yun et al. ..................... 705/26 |
| 2002/0123960 | A1 | * | 9/2002 | Ericksen ...................... 705/38 |
| 2002/0152116 | A1 | * | 10/2002 | Yan et al. ..................... 705/14 |
| 2003/0101131 | A1 | * | 5/2003 | Warren et al. ................. 705/38 |

* cited by examiner

*Primary Examiner*—Jagdish N Patel
*Assistant Examiner*—Sara Chandler
(74) *Attorney, Agent, or Firm*—Townsend and Townsend and Crew LLP

(57) ABSTRACT

A method and system are provided for automatically adjusting individual components of account processing for credit card accounts or other financial accounts based on characteristics and behavior of individual account holders. A first data store holds account data for financial accounts, including the account processing methods and associated method overrides applied to each financial account as well as account history information. A second data store holds decision rules for determining whether to apply a method override to the financial account based on the account history information. A decision engine retrieves the decision rules from the second data store and the account history information from the first data store, then determines, based on the decision rules and the account history information, whether a method override should be applied to the financial account. The decision engine then applies the method override to the financial account.

13 Claims, 10 Drawing Sheets

|  | | Cardholder Income 410 | | |
|---|---|---|---|---|
|  | | under $25,000 | $25,000 – $50,000 | over $50,000 |
| Cardholder Credit Rating 405 | under 400 | AQ-C | AQ-C | AQ-G |
| | 400–600 | AQ-C | AQ-G | AQ-P |
| | over 600 | AQ-G | AQ-P | AQ-P |

≤1yr, 2yrs, ≥3yrs — Account Age 415

| No. Delinq. Payments (505) | Balance 510 | | |
|---|---|---|---|
| | under $1,000 | $1,000 – $5,000 | over $5,000 |
| 0 | Remove | Remove | Remove |
| 1 | Same | Assign MO1 | Assign MO2 |
| 2 or more | Assign MO1 | Assign MO1 | Assign MO2 |

No. cycles delinquent 515: 0-1, 2, ≥3

FIG. 5A

| No. Delinquent Payments | Balance $10 | | |
|---|---|---|---|
| | under $1,000 | $1,000 – $5,000 | over $5,000 |
| 0 | Remove | Remove | Remove |
| 1 | Same | Same | Same |
| 2 | Same | Assign MO1 | Assign MO1 |
| 3 or more | Assign MO1 | Assign MO2 | Assign MO2 |

315b

No. cycles delinquent: 0-1, 2, ≥3

FIG. 5B

| No. Delinquent Payments | Balance | | |
|---|---|---|---|
| | under $1,000 | $1,000 – $5,000 | over $5,000 |
| 0 | Remove | Remove | Remove |
| 1 | Last | Last | Same |
| 2 | Same | Same | Same |
| 3 or more | Same | Same | Assign M01 |

FIG. 5C

```
CMO 022829102482345 6
14:40:09 09/29/01                    CMO                  PAGE 0001 OF 0001
DOE,JOHN**1234 S 6ST**OMAHA*NE*68155*022829102482345 6

SEARCH DATE              MM/DD/YYYY

CHANGE
TRANSACTION   CODE   RESULT   RESULT  STATUS  SOURCE     DATE
  S/S/S              OLD      NEW     LOCK
-- CP IC IM   SK     ZZ0001   BA0022    U                9/22/YYYY
-- CP IC BP   TK     ZZ0001   BA0022    L                9/22/YYYY
-- CP IC MP   TK     ZZ0001   BA0022    U                9/22/YYYY
-- CP IC IP   MK     ZZ0001   BA0022    U                9/22/YYYY
-- CP IC MF   NU     ZZ0001   BA0022    U                9/22/YYYY
-- CP IC PE   #1     ZZ0001   BA0022    L                9/22/YYYY
-- CP IO AC   ML     ZZ0001   BA0022    U                9/22/YYYY
-- CP IO CI   PI     ZZ0001   BA0022    U                9/22/YYYY

S - SELECT          D - DISPLAY METHOD DESCRIPTION
  PF3 EXIT   PF7 PAGEBACK    PF8 PAGEFWD
```

FIG. 7A

```
14:40:09  09/29/01           OVERRIDE AUDIT HISTORY      PAGE 0001 OF 0001
DOE,JOHN**1234 S 6ST**OMAHA*NE*68155*02282910248234546
TRAN                                        OLD      NEW
DATE     CA/AQ   S/S/S              RESULT  RESULT    ROW   REASON
09/22/YYYY  AQ   CP IC IM  ZZ0001   BA0022  369   NM Chng
B/A                                                 NEXT         NEXT       LAST
CODE       LOCK START      LOCK END                 RESULT       DATE       DIFFERENT
B          DATE            DATE                     ZZ0001       ZZ0001     ZZ0001
           MM/DD/YYYY      MM/DD/YYYY ELEMENT    "DECISION ELEMENT DESCRIPTION"              TABLE                  HONOR
OLD VALUE  "N"                                          ID                    NEXT
NEW VALUE  "Y"                                         AAA001                  0

DECISION ELEMENTS
ELEMENT     DATA              ELEMENT       DATA
DEL TIMES 1+   N              DEC ELEM 6     Y
DEC ELEM 2                    DEC ELEM 7     Y
DEC ELEM 3                    DEC ELEM 8     Y
DEC ELEM 4                    DEC ELEM 9     Y
DEC ELEM 5                    DEC ELEM 10    Y

PF4/5   PREV/NEXT S/S/S   PF7/8  PREV/NEXT AUDIT RECORD
PF10/11  PREV/NEXT DECISION ELEMENTS  PF3 EXIT   PF12 RETURN
```

FIG. 7B

METHOD AND SYSTEMS FOR HANDLING METHOD LEVEL PROCESSING IN CONNECTION WITH ACCOUNT PRICING

BACKGROUND OF THE INVENTION

The present invention relates in general to pricing and processing of a credit card account, and in particular to systems and methods for controlling account pricing and processing for an individual cardholder based on cardholder characteristics and behavior.

Credit card issuers, such as banks, retailers, or other financial service providers, provide cardholders with credit card accounts. In a typical credit card agreement, the card issuer agrees to transfer funds to merchants in payment for goods and services received by the cardholder, and the cardholder agrees to repay the card issuer. The terms of the agreement also provide that the card issuer may impose various charges against the credit card account. For instance, cardholders are generally charged interest on their account balances. Cardholders may also be charged annual fees, as well as charges for late payments, returned checks, exceeding the stated limit on the credit card account, and the like. Credit card accounts are generally priced by establishing the amounts of the various fees, interest and other charges at levels that enable the card issuer to profit from providing the credit card account.

Account pricing has been implemented by defining a "pricing method" for each of the applicable fees, interest, and other charges. A pricing method establishes values for parameters that control the computation of a particular charge. For instance, an interest rate method might include parameters defining how to compute a balance (e.g., whether to compute it daily or monthly, what types of transactions to include) and a parameter establishing the value of the interest rate (e.g., a 15% annual percentage rate (APR)). A minimum payment method might include parameters establishing that the payment amount is equal to the larger of a dollar amount (e.g., $20) and a percentage of the outstanding balance (e.g., 2%). When the cardholder is billed, the pricing methods are used to control computation of the charges imposed by the card issuer. For instance, when the finance charge is determined, the computation of the account balance and the amount of interest to charge are controlled by parameters set by the interest rate method. When the minimum payment is computed, parameters of the minimum payment method are used to control the computation.

In addition to pricing, other methods may be defined to establish parameter values governing other aspects of cardholder account processing. For example, a statement-production method may be provided that sets parameters governing the type of paper to be used and the information to be included on statements sent to cardholders. In another example, methods may also be defined to establish parameter values related to incentive or rewards programs, such as frequent flier miles or rebates awarded based on purchasing activity. A rewards method typically sets parameter values for computing rewards points earned for various transactions (e.g., one rewards point for each dollar spent in a purchase transaction), and so on. In short, an "account processing method" (or "processing method") may be provided for any aspect of cardholder account processing that is amenable to control via parameter values.

A pricing "strategy" is established by defining a pricing method for each charge that could be imposed. For instance, one pricing strategy may include a first method establishing an interest rate of 15% (APR) computed on a daily balance, a second method establishing a minimum payment amount of $20 or 2% of the account balance, a third method establishing a late payment charge of $30, and so on. The pricing strategy may be expanded into a processing strategy by including additional methods not related to charges, such as statement production or rewards methods. Thus, a typical processing strategy includes about 45 methods.

Many card issuers provide different types of card accounts with different terms and conditions, different rewards programs, and so on. These account types are generally implemented by defining multiple co-existing processing strategies, and assigning each account to one of the strategies. For instance, a card issuer may define a "classic" strategy, a "gold" strategy, and a "platinum" strategy, with the classic strategy including an interest rate of 18% and an annual fee of $20, the gold strategy including an interest rate of 16% and an annual fee of $25, and the platinum strategy including an interest rate of 15% and an annual fee of $50. The ability to assign individual cardholders to one of several co-existing strategies allows the card issuer to coordinate account pricing and other aspects of account processing with cardholder behavior to some extent.

Further coordination of account pricing and processing with cardholder behavior is desirable. For instance, a card issuer may desire to impose penalty pricing on individual cardholders who violate the terms and conditions of the cardholder agreement, e.g., by increasing the interest rate for cardholders who are delinquent in paying. As another example, a card issuer may desire to offer incentive pricing, such as a temporary reduction in the interest rate, in order to attract new cardholders or to encourage existing cardholders to increase their use of the issuer's cards. Such penalty or incentive pricing typically involves adjusting a small number of parameters within one or two account processing methods for the accounts of cardholders who qualify for the penalty or incentive.

Existing systems provide only limited ability to make such adjustments within an account processing method. In some systems, each account is assigned a processing strategy (e.g., "classic," "gold," or "platinum"), and the processing for all accounts assigned to that strategy is determined by the account processing methods that make up the assigned strategy. In such a system, adjusting a single processing parameter requires the card issuer to define a new strategy that differs from the old strategy in one account processing method. The card issuer must then identify the accounts to which the change should be applied and reassign those accounts to the new strategy. Subsequent changes intended to affect all cardholders must be made separately for each strategy, making this approach burdensome and inefficient.

Other existing systems allow the card issuer to override one or more of the processing parameters for an individual account by applying a method override that changes the value of one or more of the parameters of an account processing method. For instance, a penalty interest rate may be imposed by applying a method override to an account that changes the rate to a higher value but otherwise leaves the interest rate method unchanged. However, these systems provide limited functionality for identifying accounts to which a method override is to be applied. Generally, the card issuer must search account records to generate a list of qualifying accounts. Once the accounts are identified, applying a method override generally involves manually updating each account record. Subsequently removing the method override (to restore the default account processing method) involves a second manual update.

Hence, systems and methods for automatically adjusting individual price terms for a cardholder account would be desirable.

BRIEF SUMMARY OF THE INVENTION

The present invention provides systems and methods for flexibly adjusting individual components of account processing for financial accounts such as credit card accounts based on characteristics and behavior of individual account holders. Each account is assigned an account processing method that establishes various parameters of account processing. One or more of the methods is made overrideable by a method override that, when applied to an account, changes one or more of the parameter values established by the account processing method. Whether to apply each available method override to a particular cardholder account is determined automatically using decision rules related to one or more aspects of cardholder characteristics and behavior.

According to one aspect of the invention, there is provided a method for using a decision engine to adjust parameter values of a financial account. An account processing method is assigned to the financial account to set one or more parameter values of the financial account, the account processing method having an associated method override that modifies at least one of the one or more parameter values set by the account processing method. The decision engine is provided a set of decision criteria comprising a set of decision elements each having one or more threshold values associated therewith, the set of decision elements corresponding to account attributes of the financial account. The decision engine is also provided the corresponding account attributes of the financial account. A result is obtained from the decision engine indicating whether to apply the associated method override to the financial account, wherein the decision engine determines the result by applying the decision criteria to the account attributes. The associated method override is applied to the financial account in response to a result indicating that the associated method override is to be applied.

In some embodiments of the present invention, the set of decision criteria comprises a lookup table, an entry in the lookup table being defined by the decision elements and the one or more threshold values, and each entry in the lookup table being associated with a result value indicating whether to apply the associated method override to the financial account. In this case, the decision engine may apply the decision criteria to the account attributes by performing a table lookup operation on the lookup table using the corresponding account attributes of the financial account.

In some embodiments, the result value may be one of a first value indicating that the method override is to be applied; a second value indicating that a currently applied method override is to be removed; a third value indicating that the method override is not to be applied and that no method override is to be removed; and a fourth value indicating that a formerly applied method override is to be reapplied.

According to another aspect of the invention, there is provided a method for adjusting parameter values for a financial account. An account processing method is selected that sets one or more parameter values for the financial account, the account processing method being overrideable by a first method override that changes at least one of the one or more parameter values set by the account processing method. A first lookup table associated with the selected account processing method is identified. From the first lookup table a set of first decision elements is identified, the first decision elements corresponding to a set of first account attributes. The set of first account attributes is retrieved from a record of the financial account, and a first table lookup is performed in the first lookup table using the set of first account attributes, the first table lookup returning a reference to a second lookup table. From the second lookup table a set of second decision elements is identified, the second decision elements corresponding to a set of second account attributes. The set of second account attributes is retrieved from the record of the financial account, and a second table lookup is performed in the second lookup table using the set of second account attributes, the second table lookup returning a result indicating whether the first method override is to be applied to the financial account. Based on the result, the record of the financial account is updated to cause the first method override to be applied (or not applied) to the financial account.

In some embodiments of the present invention, the result value may be one of a first value, a second value, a third value, and a fourth value. In response to the first value, the method override is added to the record of the financial account, thereby causing the method override to be applied to the financial account. In response to the second value, a currently applied method override is removed from the record of the financial account, thereby causing the currently applied method override to cease to be applied to the financial account. In response to the third value, no changes are made to the record of the financial account. In response to the fourth value, a formerly applied method override for the financial account is determined; and the formerly applied method override is added to the record of the financial account, thereby causing the formerly applied method override to be reapplied to the financial account. Where the account processing method is also overrideable by a second method override, the first value may include an indication of which of the first and second method overrides is to be applied. The method may also be applied to other overrideable account processing methods.

According to a further aspect of the invention, there is provided a method for using a decision engine to adjust parameter values for a plurality of financial accounts. A financial account is selected from the plurality of financial accounts, the selected financial account having associated therewith an account processing method that sets one or more parameter values of the selected financial account. The decision engine is provided decision criteria comprising a set of decision elements each having one or more threshold values associated therewith, the set of decision elements corresponding to account attributes of the financial account. The decision engine is also provided the corresponding account attributes of the selected financial account. A result value is obtained from the decision engine, wherein the decision engine determines the result value by applying the decision criteria to the corresponding account attributes. A method override indicated by the result value is applied to the selected financial account, the method override causing one or more of the parameter values set by the account processing method to be adjusted. Selecting a financial account may involve selecting each account in turn. Alternatively, selecting a financial account may involve accepting a user selection of a financial account.

According to a still further aspect of the invention, there is provided a system for adjusting a processing parameter of a financial account. The system includes a first data store for storing financial account data for the financial account, the financial account data including account processing methods and associated method overrides applied to the financial account, the financial account data further including account history information; and a second data store for storing decision rules for determining whether to apply a method override to the financial account based on the account history information. The system also includes a decision engine configured to communicate with the first data store and the second data store, the decision engine configured to retrieve the decision rules from the second data store and the account history information from the first data store, to determine based on the decision rules and the account history information whether a method override should be applied to the financial account, and to apply the method override to the financial account.

In some embodiments of the present invention, the decision rules are implemented using a hierarchical set of lookup tables. The hierarchical set of lookup tables may include: a method selection table, each entry in the method selection table corresponding to an overrideable method; a plurality of client allocation tables, each entry in each client allocation table corresponding to a combination of first decision elements; and a plurality of account qualification tables, each entry in each account qualification table corresponding to a combination of second decision elements. A table lookup operation on the method selection table using one of the overrideable methods returns a reference to one of the plurality of client authentication tables; a table lookup operation on one of the plurality of client authentication tables using financial account data corresponding to the first decision elements returns a reference to one of the plurality of account qualification tables; and a table lookup operation on one of the plurality of account qualification tables using financial account data corresponding to the second decision elements returns a result value indicating whether the method override is to be applied to the financial account.

The system may also include a user interface configured to communicate with the first data store, wherein the user interface is configured to provide financial account data including whether a method override is applied to the financial account.

In some embodiments, the system also includes a conflict checking module configured to detect a combination of account processing methods and associated method overrides that creates a conflict when applied to a financial account and to issue a warning when the combination is detected.

According to yet another aspect of the invention, there is provided a system for adjusting processing parameters of a plurality of financial accounts. The system includes a first data store for storing financial account data for the plurality of financial accounts, the financial account data including account processing methods and associated method overrides applied to each of the plurality of financial accounts, the financial account data further including account history information for each of the plurality of financial accounts; and a second data store for storing decision rules for determining whether to apply a method override to one of the plurality of financial accounts based on the account history information. An account selection module of the system is configured to select one of the plurality of financial accounts. The system also includes a decision engine configured to communicate with the first data store, the second data store, and the account selection module, the decision engine configured to retrieve the decision rules from the second data store and the account history information for the selected financial account from the first data store, to determine based on the decision rules and the account history information whether a method override should be applied to the selected financial account, and to apply the method override to the selected financial account. The account selection module may be configured to select each of the plurality of financial accounts in turn. Alternatively, the account selection module may be configured to accept a user selection of a financial account.

The following detailed description together with the accompanying drawings will provide a better understanding of the nature and advantages of the present invention.

BRIEF DESCRIPTION OF THE DRAWINGS

FIG. 4 is a table illustrating the contents of a cardholder allocation table according to an exemplary embodiment of the present invention;

FIGS. 5A-C are tables, each illustrating the contents of an account qualification table according to an exemplary embodiment of the present invention;

FIGS. 7A-B are screen shots showing a presentation of method override information for a cardholder account according to an exemplary embodiment of the present invention.

DETAILED DESCRIPTION OF THE INVENTION

The present invention will now be described with reference to exemplary embodiments. The present invention provides systems and methods for flexibly adjusting individual components of account processing based on characteristics and behavior of individual cardholders. In an exemplary embodiment, each account is assigned a processing strategy that includes a set of account processing methods establishing parameters of account processing. One or more of the methods is made overrideable; in other words, a method override is provided that, when applied to an account, changes one or more of the parameters of an account processing method from the default values established by the processing strategy. Whether to apply each available method override to a particular cardholder account is determined automatically using decision rules related to one or more aspects of cardholder characteristics and behavior.

For example, in one exemplary embodiment, a processing strategy includes an interest rate method establishing an annual rate of 15%; this method also establishes other parameters (e.g., for computing the balance to which the annual rate is applied). A method override is provided that, when applied to an account, changes the interest rate for that account to 18% without affecting other parameters of the interest rate method. A decision rule is also provided that establishes that the method override is to be applied only to accounts with one or more delinquent payments and a balance between $1,000 and $5,000. An account record is reviewed to determine whether the account meets the criteria of the decision rule. If it does, then the method override is applied, and subsequent bills are computed using the 18% interest rate established by the method override and other parameters established by the interest rate method.

In some alternative embodiments, multiple method overrides may be associated with the same account processing method. For instance, for an interest rate method, there may be a first method override that changes the interest rate to 18% and a second method override that changes the interest rate to 21%. It will be appreciated that in this example, both method overrides would not be simultaneously applied to the same cardholder account, but the first method override could be applied to a first account while the second method override is applied to a second account and no method override is applied to a third account.

Figure 1:
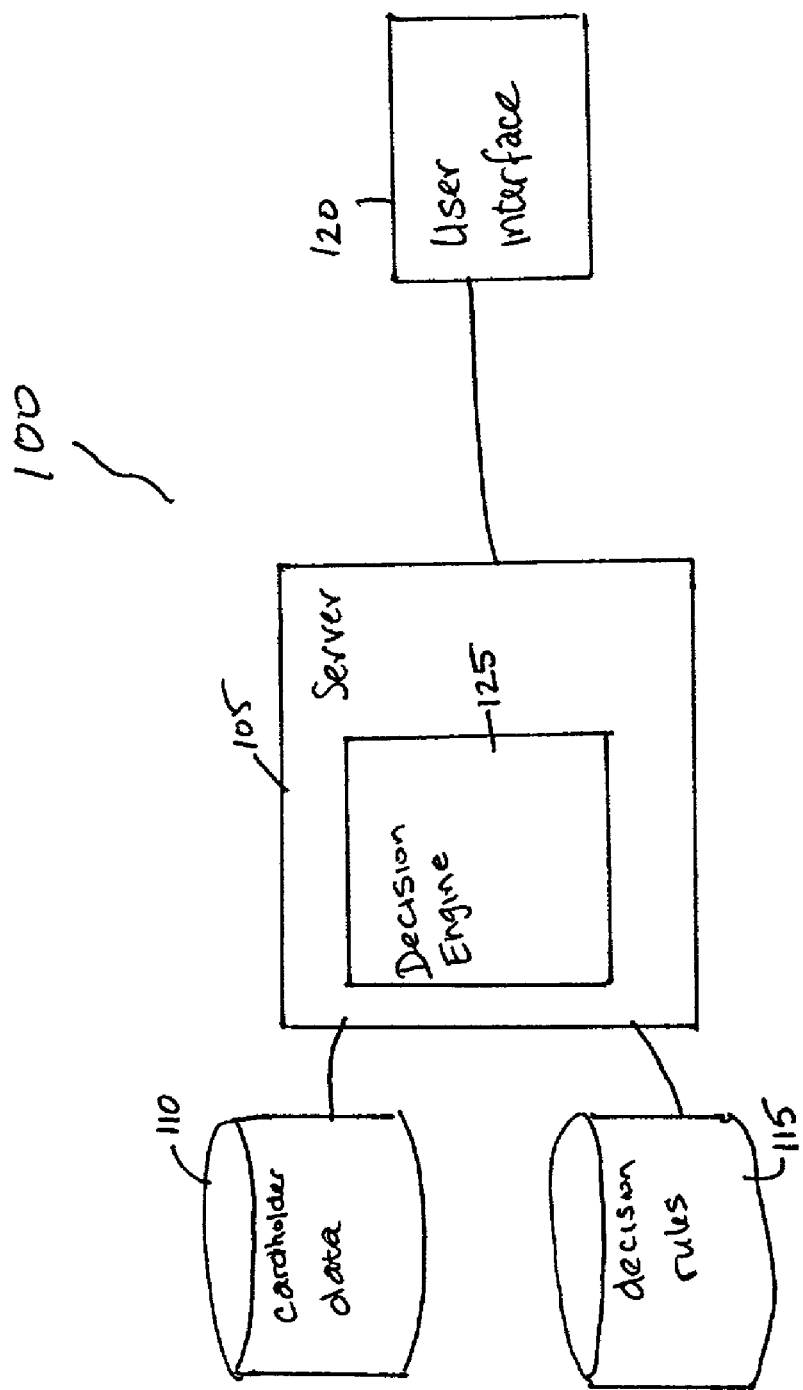
FIG. 1 is a simplified block diagram of a system for applying method overrides to credit card accounts according to an exemplary embodiment of the present invention.

FIG. 1 illustrates an exemplary embodiment of a system 100 for controlling the application of method overrides to cardholder accounts according to the present invention. A server 105 communicates with an account data store 110 that contains cardholder account information and with a rules data store 115 that contains decision rules governing the application of method overrides. In one exemplary embodiment, server 105 is implemented as one or more computer processors. Each of account data store 110 and rules data store 115 may be implemented using magnetic disk, tape, or any other computer-readable media, and each of account data store 110 and rules data store 115 may be local to server 105 or remote and accessible via a network.

A user interface 120 is provided to enable a user (such as an employee of the card issuer) to control various functionality of server 105, and to view and/or modify data in account data store 110 and rules data store 115. User interface 120 generally includes a display device (e.g., a monitor) for providing information to a user and an input device (e.g., a keyboard) for accepting input from a user. User interface 120 may also include other components, such as hardware and/or software security components to prevent unauthorized use. User interface 120 may be local to server 105 or remote and connected to server 105 via a network.

Figure 2:
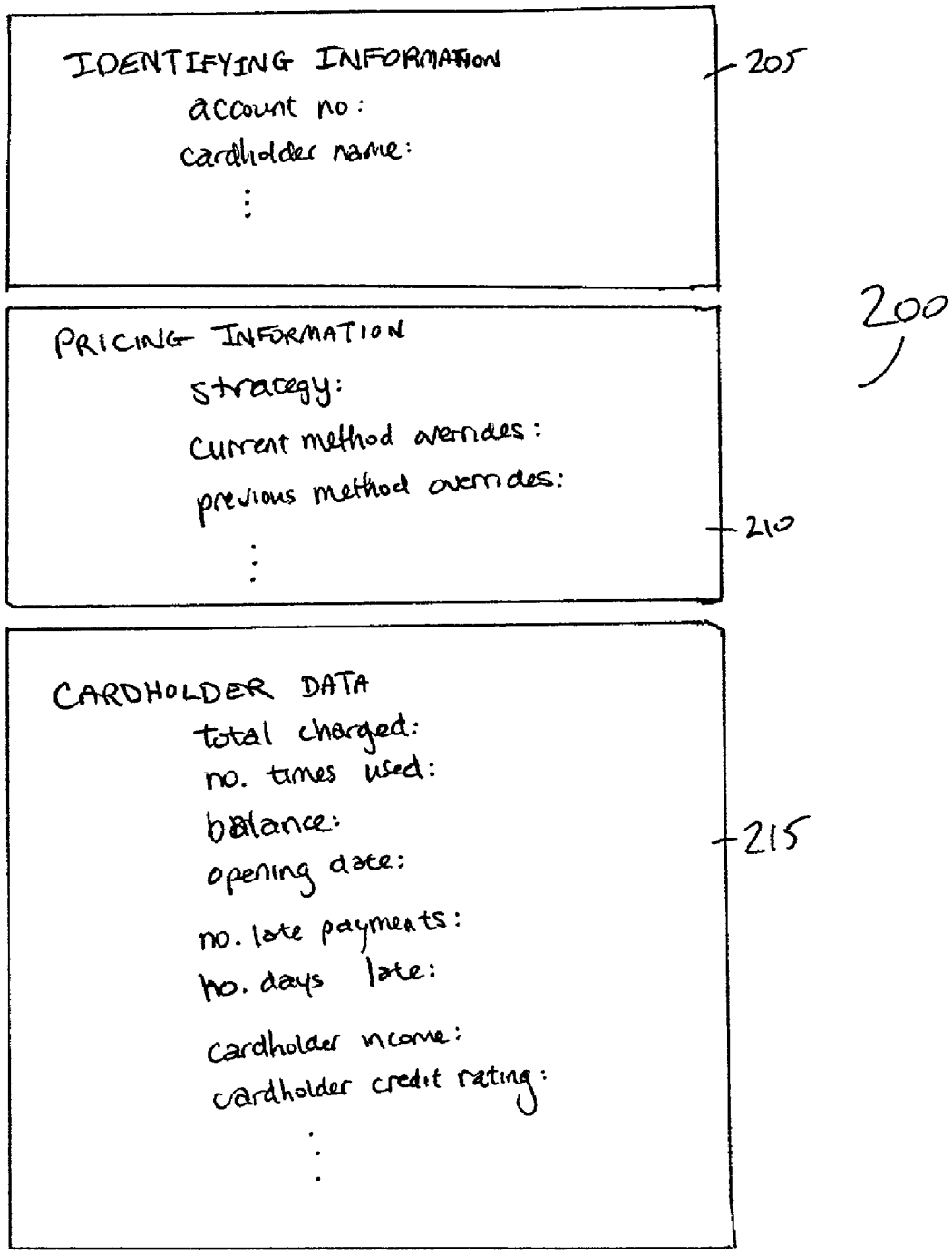
FIG. 2 is a simplified block diagram of a cardholder record according to an exemplary embodiment of the present invention.

Cardholder account information in account data store 110 includes an account record (or cardholder record) corresponding to each cardholder account. An example of an account record 200 is shown in FIG. 2. Each account record 200 includes identifying information 205 for the account (e.g., account number, cardholder name, etc.). Each account record 200 also includes processing information 210, such as an identifier indicating the processing strategy applied to the account and identifiers of any method overrides that are currently applied. The method override information may be stored in one or more fields in cardholder record 200; for instance, a list of names of currently applied method overrides may be stored. In some embodiments, processing information 210 also includes processing history information related to formerly applied method overrides, i.e., method overrides that once were, but no longer are, applied to the account. The processing history information may be stored in a history file, and account record 200 may contain a reference to that file. Account record 200 also includes cardholder characteristics data 215, including account usage and payment patterns, cardholder income, cardholder credit score, etc. It will be appreciated that FIG. 2 is illustrative and that other information may be stored in account record 200; for instance, data related to individual credit card transactions (e.g., where the card was used, the total amount of the transaction, the date of the transaction) may also be stored. Storage and management of account records 200 may be implemented using conventional database products, flat files, or any other data management technology.

Referring again to FIG. 1, the decision rules in rules data store 115 are defined by the card issuer for each overrideable method. The decision rules determine whether an available method override is to be applied to a cardholder account on the basis of one or more decision elements. Each decision element reflects one or more features of cardholder characteristics and behavior stored in account record 200, such as the number of late payments, the age of the account, account balance, frequency of use of the card, total amount charged to the account over a fixed time period, payment history, cardholder income, cardholder credit rating, and the like. It will be appreciated that the number of decision elements may be quite large, and that any information related to cardholder characteristics and behavior may be used as a decision element. The decision rules may advantageously be implemented using a set of lookup tables, as will be described further below.

Server 105 operates a decision engine 125 for applying decision rules to account records. Decision engine 125 retrieves decision rules from rules data store 115 and an account record from account data store 110. Decision engine 125 then applies the decision rules to data in the account record in order to determine whether to apply a particular method override to the cardholder account. In one exemplary embodiment, decision engine 125 is also configured to update the account record in account data store 110 when a method override is to be applied or removed.

In an exemplary embodiment, decision engine 125 has several modes of operation. In a first operating mode, decision engine 125 reviews and updates each account record (or a selected subset of the account records) in account data store 110. In a second operating mode, decision engine 125 reviews some or all of the account records in account data store 110 without updating the account records; instead, decision engine 125 makes information from the review, including whether any method overrides were selected for application to each cardholder account, available to the card issuer. In a third operating mode, decision engine 125 is used to process a new account application by determining the terms and conditions that would apply to a prospective new account. These operating modes will be described further below. It is to be understood that decision engine 125 may have more or fewer operating modes. The various operating modes of decision engine 125 may be controlled by an operator via user interface 120.

It will be appreciated that the description of system 100 herein is illustrative. The components described herein may be modified or varied, and more or fewer components may be used. Based on the disclosure and teachings herein, those of ordinary skill in the art will recognize other ways and/or methods of implementing the present invention.

Figure 3:
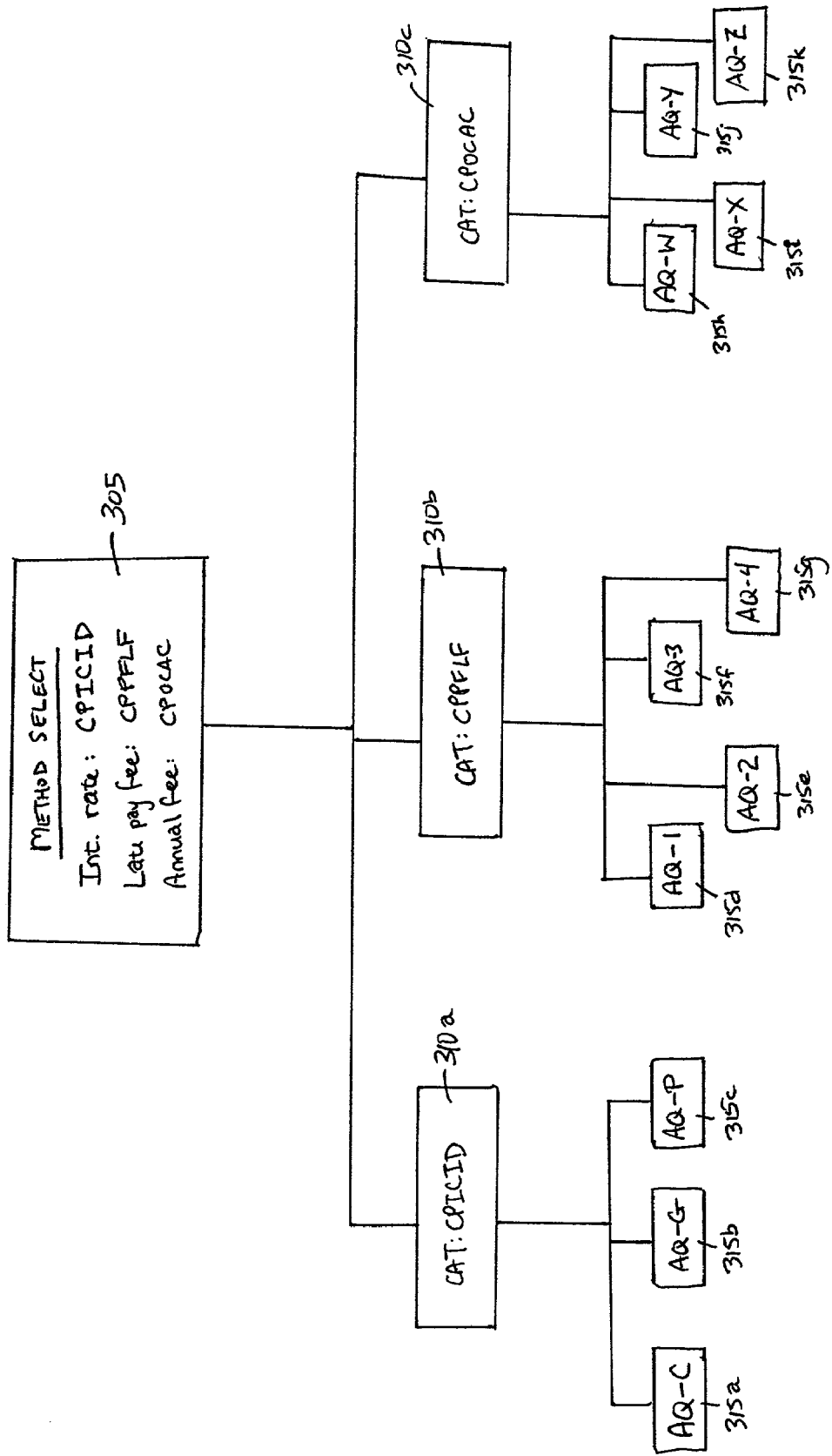
FIG. 3 is a simplified block diagram of a hierarchical arrangement of lookup tables implementing decision rules according to an exemplary embodiment of the present invention.

In one exemplary embodiment, the decision rules stored in rules data store 115 are implemented as a hierarchical arrangement of look-up tables, an example of which is shown in FIG. 3. At the top is a method selection table 305, in which each overrideable method is listed. The example shown has three overrideable methods (interest rate, late payment fee, and annual fee), but it will be appreciated that any or all of the methods making up a processing strategy may be made overrideable in the same manner as the examples described herein. It will also be appreciated that not all methods are required to be overrideable. For instance, an embodiment of a processing strategy may include 44 methods, of which 27 are overrideable; in that case, the method selection table 305 would have 27 entries.

For each entry in the method selection table 305, there is a corresponding client allocation (CA) table, such as CA tables 310a, 310b, and 310c of FIG. 3. A table lookup operation on method selection table 305 using a particular overrideable method returns a reference to a corresponding CA table 310a, 310b, 310c. Each CA table performs a first sorting of cardholder accounts based on selected decision elements. FIG. 4 shows an exemplary implementation of a CA table 310a for an overrideable interest rate method. In this example, the decision elements are cardholder credit score 405, cardholder income 410, and account age 415. Various thresholds are set in connection with each decision element. For example, cardholder credit score 405 has thresholds at values of "400" and "600"; thus, accounts are grouped by whether the cardholder's credit score is less than "400," between "400" and "600," or greater than "600." With regard to cardholder income 410, accounts are grouped by whether the cardholder's income is under $25,000, between $25,000 and $50,000, or over $50,000. With regard to account age 415, accounts are grouped by whether the account is less than a year old, between one year and three years old, or three or more years old.

Returning to FIG. 3, one or more account qualification (AQ) tables are associated with each CA table. Thus, AQ tables 315a, 315b, 315c are associated with CA table 310a; AQ tables 315d, 315e, 315f, and 315g are associated with CA table 310b; and AQ tables 315h, 315i, 315j, and 315k are associated with CA table 310c. A table lookup operation on CA table 310a using cardholder data for a particular account returns a reference to one of the associated AQ tables 315a, 315b, and 315c. In FIG. 4, "AQ-C," "AQ-G," and "AQ-P" refer, respectively to AQ tables 315a, 315b, and 315c of FIG. 3. For example, if a cardholder has a credit score of "420," an income of $22,000 and an account age of three years, a table lookup operation on CA table 310a (FIG. 4) would return a reference to table 315a of FIG. 3. The AQ tables provide further sorting of accounts, as will be described below.

It will be appreciated that any number and any combination of decision elements may be included in a CA table such as table 310a. In some embodiments, the maximum number of decision elements that a card issuer may select for inclusion in a CA table may be limited (e.g., to 20 decision elements) in order to reduce the potential table size and complexity. Moreover, each CA table 310a, 310b, 310c within a set of decision rules may include different decision elements and different thresholds associated with particular decision elements. A single CA table may include references to any number of AQ tables.

AQ tables 315a-315k of FIG. 3 provide further sorting of cardholder accounts using additional decision elements. Exemplary implementations of AQ tables 315a, 315b, 315c corresponding to CA table 310a are illustrated in FIGS. 5A-C, respectively. AQ table 315a is used when a reference to table AQ-C is returned by CA table 310a of FIG. 4; AQ table 315b is used when a reference to table AQ-G is returned by CA table 310a; and AQ table 315c is used when a reference to table AQ-P is returned by CA table 310a. In each AQ table 315a, 315b, 315c, three decision elements are used: number of delinquent payments 505, account balance 510, and number of billing cycles a payment is delinquent 515. Again, various thresholds are set in connection with each decision element. For instance, in table 315a, the number of delinquent payments 505 is grouped as zero, one, or two or more.

A table lookup operation on an AQ table using cardholder data for a particular account returns a result value that indicates whether a method override is to be applied. In one exemplary embodiment, illustrated in FIGS. 5A-C, each result has one of four possible values—"Assign," "Last Different," "Same," or "Remove." A result of "Assign" indicates that a method override is to be applied to the cardholder account. Where multiple method overrides are available for a particular method, the "Assign" result includes an identifier of the method override to be applied. For instance, in FIGS. 5A-C, each "Assign" result includes either identifier "MO1" or identifier "MO2." In this example, identifier "MO1" identifies a first method override that changes the interest rate to 18%, and identifier "MO2" identifies a second method override that changes the interest rate to 21%. In some alternative embodiments, a result value of "Assign" is indicated by returning only the method override identifier. A result of "Last Different" indicates that a formerly applied method override is to be reapplied to the cardholder account, as described further below. A result of "Same" indicates that the status of the account is unchanged—i.e., a current method override (if present) is to remain in effect but no new method override is to be applied. A result of "Remove" indicates that the current method override is to be taken off the account, restoring the default method.

It will be appreciated that the AQ tables of FIGS. 5A-C are illustrative and that variations and modifications are possible. For instance, any number of decision elements may be included in each AQ table. In some embodiments, the maximum number of decision elements that a card issuer may select for inclusion in an AQ table may be limited (e.g., to 20) in order to reduce the potential size and complexity of the tables. In the exemplary tables shown in FIGS. 4 and 5A-C, the set of decision elements included in AQ tables 315a, 315b, 315c is disjoint from the set of decision elements included in CA table 310a, but this is not required. It will also be appreciated that each of AQ tables 315a-315k of FIG. 3 may employ different decision elements, different numbers of decision elements, and/or different threshold values associated with particular decision elements. In addition, the result values described herein for an AQ table lookup operation are illustrative, and a person of ordinary skill in the art will recognize that other result values or other combinations of result values may be implemented.

In some alternative embodiments, CA tables are not used for account sorting; instead, only AQ tables are used. In an embodiment where CA tables are included, this option may be implemented by making each CA table a transparent pass-through that always returns the same AQ table reference. For instance, in FIG. 3, table 310c may be configured to return a reference to AQ table 315h for all cardholders. One skilled in the art will recognize that implementations with a non-transparent CA table such as table 310a provide additional flexibility. For instance, CA table 310a may be used to sort account holders based on the processing strategy assigned to the account—e.g., "classic," "gold," or "platinum"—by returning a reference to AQ-C table 315a for "classic" cardholders, to AQ-G table 315b for "gold" cardholders, and to AQ-P table 315c for "platinum" cardholders. Because each AQ table may establish different decision rules for applying a method override, it is possible for a card issuer to implement multiple processing strategies where each processing strategy has different default methods and different method overrides, as well as different conditions for applying the method overrides.

In other embodiments, additional levels of account sorting tables may be included between the CA tables and the AQ tables to provide further account classification. One of ordinary skill in the art will recognize that the additional levels may be implemented by providing a sequence of levels of lookup tables, with tables at each level returning references to tables at the next level. For instance, a CA table lookup may return a reference to a table at an intermediate level, and a lookup in a table at the intermediate level may return a reference to an AQ table.

Figure 6:
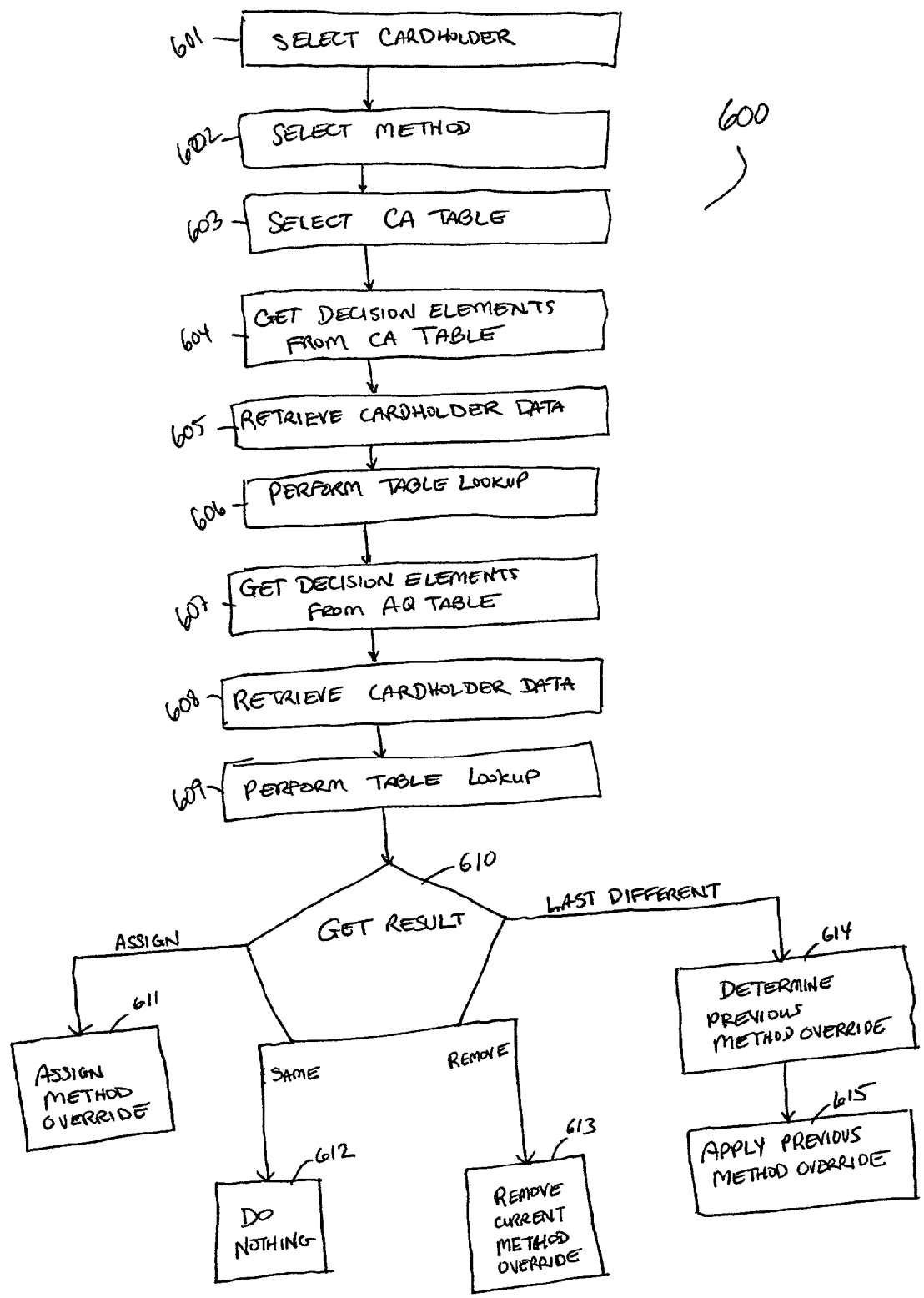
FIG. 6 is a flow chart of an exemplary process for applying a method override to a cardholder account according to the present invention.

FIG. 6 is a flow chart of an exemplary process 600 for applying method overrides to cardholder accounts. Process 600 may be executed by decision engine 125 of FIG. 1. Process 600 involves accessing an account record 200 from account data store 110, then performing table lookup operations using look-up tables from rules data store 115 and account data from the account record 200 to determine whether a method override is to be applied to the account. For purposes of illustrating process 600, the exemplary CA table 310a of FIG. 4 and the exemplary AQ tables 315a, 315b, 315c of FIGS. 5A-C will be referred to herein; it will be appreciated that other tables may be substituted. In addition, it will be presumed for illustrative purposes that account data store 110 includes account records for hypothetical cardholders X, Y, and Z, and that each of these account records includes the respective data shown in Table 1. The various entries in Table 1 will be described further below. It will be appreciated that records for other cardholders may also be included in account data store 110 and that an account record may include other data not shown in Table 1.

TABLE 1

|  | Cardholder X | Cardholder Y | Cardholder Z |
| --- | --- | --- | --- |
| Processing Strategy | Classic | Gold | Platinum |
| Current Int. Rate Method Override | none | MO2 | none |
| Last Different Int. Rate override | none | MO1 | MO2 |
| Credit score | 420 | 550 | 777 |
| Income | $22,000 | $35,000 | $80,000 |
| Account age | 3 years | 4 years | 3 years |
| No. Delinquencies | 1 | 0 | 1 |
| Average Balance | $1,500 | $500 | $2,500 |
| No. Cycles Delinquent | 1 | 0 | 1 |

Referring to FIG. 6, at step 601 an account record is selected. For instance, decision engine 125 may be configured to select each account record sequentially. Alternatively, an operator may select an account record or a set of account records via user interface 120. At step 602, one of the overrideable methods is selected. For example, the overrideable interest rate method may be selected. Method selection may be performed automatically by decision engine 125 (e.g., by cycling through all overrideable methods for each cardholder account) or manually by an operator via user interface 120. Next, at step 603, the decision engine 125 selects the appropriate CA table by performing a table lookup in the method selection table (e.g., table 305 of FIG. 3) using the method selected at step 602. The table lookup returns a reference to a CA table; for instance, a table lookup in table 305 using the interest rate method returns a reference to CA table 310a.

At step 604, the decision engine identifies the decision elements used in the selected CA table. In CA table 310a of FIG. 4, the decision elements are credit score 405, cardholder income 410, and account age 415. At step 605, the decision engine 125 retrieves the corresponding account data from the account record. For instance, for cardholder X, the decision engine 125 would retrieve a credit score of 420, an income of $22,000, and an account age of three years. For cardholder Y, the decision engine 125 would retrieve a credit score of 550, an income of $35,000, and an account age of four years. For cardholder Z, the decision engine 125 would retrieve a credit score of 777, an income of $80,000, and an account age of four years.

It will be appreciated that a decision element need not correspond exactly to a field in the account record 200. For instance, the account record 200 may include the opening date of the account, which is constant, rather than the account age, which would require periodic updating. If the opening date is stored, the account age may be readily computed based on the opening date and the current date. Thus, step 605 may include performing computations to convert data in the account record 200 to a format corresponding to the decision element.

At step 606, the decision engine 125 selects the appropriate AQ table by performing a table lookup in the selected CA table 310a using the cardholder data. The lookup returns a reference to an AQ table. For instance, a table lookup in CA table 310a (FIG. 4) using the characteristics given in Table 1 for cardholder X would return a reference to the AQ-C table (table 315a of FIG. 5A); for cardholder Y, a reference to the AQ-G table (table 315b of FIG. 5B); and for cardholder Z, a reference to the AQ-P table (table 315c of FIG. 5C).

At step 607, the decision engine 125 identifies the decision elements used in the selected AQ table. For instance, in table 315a in FIG. 5A, the decision elements are number of delinquent payments 505, account balance 510, and number of cycles delinquent 515. At step 608, the decision engine retrieves the corresponding data for the cardholder account. This step is generally similar to step 605 and may include converting data in the account record to a format corresponding to the decision element. In an alternative embodiment, the corresponding account data have already been retrieved at step 605, and step 608 may be skipped.

At step 609, the decision engine 125 performs a table lookup in the selected AQ table using the account data, and the lookup returns a result. For example, for cardholder X of Table 1, a result of "Assign MO1" would be obtained from AQ-C table 315a; for cardholder Y, a result of "Remove" would be obtained from AQ-G table 315b; and for cardholder Z, a result of "Last Different" would be obtained from AQ-P table 315c. It should be noted that the result for a particular cardholder may depend in part on which AQ table was selected at step 606. For instance, Table 1 shows that each of cardholders X and Z has one late payment, a balance between $1,000 and $5,000, and a payment one cycle delinquent. But because these two cardholders would be referred to different AQ tables (based on other characteristics), cardholder X would receive a result of "Assign MO1" while cardholder Z would receive a result of "Last Different."

At step 610, the decision engine 125 acts upon the result. If the result is "Assign," then at step 611 the method override associated with the "Assign" result is applied to the cardholder account. For example, cardholder X would have the "MO1" override applied, meaning that cardholder X's interest rate would be changed to 18%. The mechanism for applying a method override depends on the implementation of an account record. For instance, in one embodiment, the account record includes fields for storing method override identifiers, and a method override is applied to an account by modifying one of these fields. In an alternative embodiment, a list of all method overrides currently applied to the account is maintained in the account record or in an associated file; in this embodiment, step 611 includes adding the newly applied method override to the list.

If the result is "Same," then at step 612, the account record is left unchanged, i.e., no new method override is applied, while any currently applied method override remains applied.

If the result is "Remove," then at step 613, it is determined whether a method override corresponding to the method selected at step 602 is currently applied to the cardholder's account. If so, then the method override is removed. For example, Table 1 shows that cardholder Y currently has a method override "MO1" applied. The "Remove" result obtained for cardholder Y would cause this method override to be removed at step 613, restoring the default interest rate parameter. Removal of a method override is implementation-dependent and may involve, for instance, modifying an appropriate field in the account record or removing the method override from a list of method overrides currently applied to the account. Upon removal, processing history information in the account record may be updated accordingly.

If the result is "Last Different," then at step 614, a formerly applied method override is determined. In an exemplary embodiment, information related to method overrides that were previously applied to and removed from an account is stored in a method override history file associated with the account record, and step 614 includes retrieving the identifier of the most recent formerly applied method override from the method override history file. At step 615, the method override identified at step 614 is applied to the cardholder account. For example, for cardholder Z, a result of "Last Different" would be obtained. At step 614, the account record for cardholder Z would be accessed to determine the last method override for interest rate that was applied; Table 1 shows that for cardholder Z, the last method override was "MO2." Then, at step 614, method override "MO2" would be applied to cardholder Z's account, changing the interest rate parameter (currently set by the default method) to 21%.

It will be appreciated that the foregoing process description is illustrative. Any or all of the account processing methods within a processing strategy may be made overrideable. For each overrideable method, the CA table may include any number of decision elements, and any number of AQ tables may be referenced by the CA table. Each AQ table may also include any number of decision elements, and different AQ tables referenced by the same CA table may include different decision elements and/or different threshold values associated with a particular decision element. Moreover, AQ tables are not limited to returning the particular result values described herein; other result values may be implemented.

Further, one skilled in the art will recognize that process 600 may be varied or modified, and that steps may be omitted, reordered or combined. For instance, method selection may precede selection of a cardholder account. Process 600 may also be modified to apply decision rules implemented using tools other than lookup tables.

As noted above, decision engine 125 of FIG. 1 may have a number of operating modes. These operating modes may be implemented using process 600 or variations thereof. For instance, in one operating mode, decision engine 125 may be used to determine the terms and conditions applicable to a prospective account. In this operation, a process similar to process 600 may be used. At step 601, cardholder data for a prospective cardholder may be obtained via user interface 120; and at step 610, instead of updating an account record, a statement including terms and conditions for the prospective account may be generated and presented via user interface 120 or via other methods, such as printing an offer for mailing to the prospective cardholder.

In some embodiments, an estimator may be provided using decision engine 125 and variations of process 600. An estimator enables a card issuer to test a set of decision rules without actually affecting any cardholder accounts. For instance, in the exemplary embodiment described above, a card issuer defines a set of decision rules by building a set of lookup tables. The set of lookup tables (or individual tables within the set) may be large and complex, for instance, where several methods are overrideable or where a lookup table includes numerous decision elements. To verify that the lookup tables are selecting the desired accounts, a proposed lookup table or set of lookup tables may be stored in a test area within rules data store 115. Decision engine 125 may then be operated in an "estimator" mode to perform table lookup operations on the tables in the test area using account data from some or all of the account records in account data store 110. The operation of decision engine 125 in estimator mode is generally similar to process 600, except that the account-updating steps (steps 610-615) are not performed. Instead, information about which accounts return which results is compiled and presented to the card issuer, e.g., via user interface 120. Information compilation and presentation may be performed using any suitable data-gathering and presentation tools and methods. The information provided enables the card issuer to verify that the proposed lookup tables are performing as intended.

In some embodiments, an estimator also allows edit checks to be performed to determine whether a combination of processing methods and/or method overrides that could be applied to an account creates a conflict. A conflict may occur, for instance, when a method override is inconsistent with another method or method override, with industry rules, or with government regulations. For purposes of edit checking, decision engine 125 may be used to determine all combinations of method overrides that may be applied to an account. Each possible combination is then tested for conflicts by reviewing selected parameter values resulting from the combination.

The following example illustrates the edit check process. Suppose that a card issuer defines an interest rate method override with parameter values establishing that interest accrues daily based on the average daily balance, and suppose that the default statement production method has parameter values establishing that the statement displays only a monthly average balance and reports interest accruing monthly. If this interest rate method override and this statement production method were simultaneously applied to a cardholder account, the statement would not accurately reflect the interest charge. The conflict can be avoided if the decision rules pertaining to the interest rate and statement production methods preclude this combination. If, however, the decision rules do not preclude this combination, then the respective parameters of the interest rate method override and the statement production method would be compared, and the conflict would be detected.

Likewise, other comparisons of parameter values may also be implemented to detect other types conflicts. For example, an industry rule may provide that cash advance transactions cannot be included in a daily balance computation. If a card issuer defines a method override that sets a parameter value causing cash advances to be included in the daily balance computation, the edit checking process detects this conflict by inspecting the values of the parameters set by the method override.

Upon detecting a conflict, a warning message is generated, identifying the conflict. The card issuer is then able to adjust the parameter values set by the methods and/or method overrides in order to eliminate the conflict before any accounts are affected. In some instances (such as the interest rate and statement production example given above), the card issuer may also be able to eliminate the conflict by modifying the decision rules to prevent a conflicting combination of methods and/or method overrides from occurring. Whether the conflict prevents a proposed set of decision rules and method overrides from being implemented may depend on the severity of the conflict. In one exemplary embodiment, the edit check process identifies each conflict as either an error or an exception. An "error" causes a warning but does not require the card issuer to eliminate the conflict before proceeding. An "exception" requires modification and may be generated, for instance, when a conflict renders a computation impossible (e.g., dividing by zero) or results in illegal activity (e.g., interest rates in violation of applicable usury laws).

Access to method override information for individual cardholder accounts may be made available via user interface 120. For example, in one embodiment, an operator (e.g., a customer service representative of the card issuer) enters a cardholder account number and requests method override data for that account. Server 105 accesses account data store 110, retrieves the account record 200, and displays the method override information to the operator.

FIG. 7A shows an example of a Cardholder Method Override (CMO) screen 700 that may be used to present method override information for a particular cardholder (John Doe). CMO screen 700 shows information including a list 705 of method overrides that are currently applied to the cardholder's account. In this example, each method for which a method override has been applied to the account is identified by a first code, e.g., "CP IC IM." The method override is identified by a second code, e.g., "BA0022." The operator may select one of the methods (e.g., "CP IC IM"), for instance by navigating a cursor to the code name of the method on screen 700 and then pressing "S" to select the method. Upon selection of a method, an Audit History screen 750, shown in FIG. 7B, is displayed.

Audit History screen 750 displays additional details related to the "CP IC IM" method override on the cardholder's account. Audit history screen 750 displays information such as when the current method override was applied to the account (transaction date 760), the last method override that was applied for the method (the "Last Different" value 765), and the decision element(s) 770 that caused the current method override to be applied. Display screens such as screens 700, 750 may be used, for instance, when a cardholder contacts the card issuer's customer service center with a question about why some aspect of the cardholder's account processing has changed. The customer service operator reviews information on screens 700, 750 to determine the answer and relays the information to the cardholder. It will be appreciated that screens 700, 750 are illustrative and that other formats may be used to provide method override information for a particular account. In one alternative embodiment, complete account history data is provided to a user, and the user is able to design customized display screens for reviewing the data.

While the invention has been described with respect to exemplary embodiments, one skilled in the art will recognize that numerous modifications are possible. For instance, although the exemplary embodiments focused on pricing methods, account processing methods may also be defined for computing amounts to be credited to accounts, for managing reward or incentive programs (e.g., awarding rebates based on the cardholder's use of the card), and in general for any aspect of credit card account management amenable to control via parameter values; one skilled in the art will recognize that the present invention may be used to manage account processing methods and method overrides associated with any aspect of account processing. Likewise, a method override may modify one, all, or any number of the parameters of its associated account processing method. Further, while the invention has been described with reference to credit card accounts, it will be appreciated that the invention may be applied to other types of financial products that have associated terms and conditions or other processing parameters that may be varied, such as loans or deposit accounts. In addition, the invention may be practiced by a third party that provides services to one or more account issuers.

In an exemplary embodiment, the present invention is implemented in the form of control logic in either a modular or integrated manner using software. However, one skilled in the art will recognize that the methods and systems of the present invention described herein may be implemented using hardware or any combination of hardware and/or software components.

Thus, although the invention has been described with respect to exemplary embodiments, it will be appreciated that the invention is intended to cover all modifications and equivalents within the scope of the following claims.

What is claimed is:

1. A method for using a computerized decision engine to adjust parameter values of a financial account, the method comprising:

assigning to the financial account an account processing method that sets one or more parameter values of the financial account, the account processing method having an associated method override that modifies at least one of the one or more parameter values set by the account processing method;

providing to the computerized decision engine a set of decision criteria comprising a set of decision elements each having one or more threshold values associated therewith, the set of decision elements corresponding to account attributes of the financial account, wherein at least one of the account attributes relates to historical usage of the account;

providing to the computerized decision engine the corresponding account attributes of the financial account;

providing to the computerized decision engine account history information about the financial account;

obtaining from the computerized decision engine a result indicating whether to apply the associated method override to the financial account, wherein the computerized decision engine determines the result by applying the decision criteria to the account attributes and the account history information;

applying the associated method override to the financial account in response to a result indicating that the associated method override is to be applied; and changing at least one parameter value of the financial account in response to applying the method override.

2. The method of claim 1, wherein:

the set of decision criteria comprises a lookup table, an entry in the lookup table being defined by the decision elements and the one or more threshold values, and each entry in the lookup table being associated with a result value indicating whether to apply the associated method override to the financial account; and applying the decision criteria to the account attributes comprises performing a table lookup operation on the lookup table using the corresponding account attributes of the financial account.

3. The method of claim 1, wherein applying the associated method override to the financial account comprises updating a record of the financial account to indicate that the associated method override is applied.

4. The method of claim 1, wherein the result value is one of:

a first value indicating that the associated method override is to be applied;

a second value indicating that a currently applied method override is to be removed;

a third value indicating that the associated method override is not to be applied and that no currently applied method override is to be removed; and a fourth value indicating that a formerly applied method override is to be reapplied.

5. The method of claim 4, further comprising:

in response to the first value, updating a record of the financial account to indicate that the associated method override is applied;

in response to the second value, updating the record of the financial account to remove the currently applied method override;

in response to the third value, leaving the record of the financial account unchanged; and in response to the fourth value:

identifying a formerly applied method override from the record of the financial account, the formerly applied method override being not currently applied to the financial account; and updating the record of the financial account to indicate that the formerly applied method override is applied.

6. The method of claim 1, wherein the financial account is a credit card account.

7. The method of claim 1, wherein the one or more parameter values are used to compute a charge against the financial account.

8. A system for adjusting a processing parameter of a financial account, comprising:

a first data store for storing financial account data for the financial account, the financial account data including an account processing method assigned to the financial account and an associated method override, wherein the account processing method sets one or more parameter values of the financial account, wherein the method override modifies at least one of the one or more parameter values set by the account processing method, and wherein the financial account data further includes account history information;

a second data store for storing decision criteria for determining whether to apply a method override to the financial account based on the account history information, the decision criteria comprising a set of decision elements each having one or more threshold values associated therewith, the set of decision elements corresponding to account attributes of the financial account, wherein at least one of the account attributes relates to historical usage of the account; and a computerized decision engine configured to communicate with the first data store and the second data store, the decision engine configured to retrieve the decision criteria from the second data store, to retrieve the account history information and the account attributes of the financial account from the first data store, and to generate a result based on the decision rules and the account history information, the result indicating whether a method override should be applied to the financial account;

wherein the system is configured to apply the method override to the financial account, wherein applying the method override to the financial account changes at least one parameter value of the financial account.

9. The system of claim 8, wherein the decision criteria comprise a hierarchical set of lookup tables.

10. The system of claim 9, wherein the hierarchical set of lookup tables comprises:

a method selection table, each entry in the method selection table corresponding to an overrideable method;

a plurality of client allocation tables, each entry in each client allocation table corresponding to a combination of first decision elements; and a plurality of account qualification tables, each entry in each account qualification table corresponding to a combination of second decision elements, wherein a table lookup operation on the method selection table using one of the overrideable methods returns a reference to one of the plurality of client authentication tables, a table lookup operation on one of the plurality of client authentication tables using financial account data corresponding to the first decision elements returns a reference to one of the plurality of account qualification tables, and a table lookup operation on one of the plurality of account qualification tables using financial account data corresponding to the second decision elements returns a result value indicating whether the method override is to be applied to the financial account.

11. The system of claim 8, wherein the financial account is a credit card account.

12. The system of claim 8, further comprising a user interface configured to communicate with the first data store, wherein the user interface is configured to provide financial account data including whether a method override is applied to the financial account.

13. The system of claim 8, further comprising:

a conflict checking module configured to detect a combination of account processing methods and associated method overrides that creates a conflict when applied to a financial account and to issue a warning when the combination is detected.

* * * * *

UNITED STATES PATENT AND TRADEMARK OFFICE
CERTIFICATE OF CORRECTION

PATENT NO.         : 7,447,657 B1                                          Page 1 of 1
APPLICATION NO.    : 10/098586
DATED              : November 4, 2008
INVENTOR(S)        : Krajewski et al.

It is certified that error appears in the above-identified patent and that said Letters Patent is hereby corrected as shown below:

On the cover page, 7$^{th}$ line of section (75) Inventors, delete "Jeffrey", and insert --Jeffery--.

Signed and Sealed this

Third Day of March, 2009

JOHN DOLL
*Acting Director of the United States Patent and Trademark Office*